Oct. 25, 1938.  H. JAMES  2,134,516
GAUGE
Filed Jan. 11, 1935
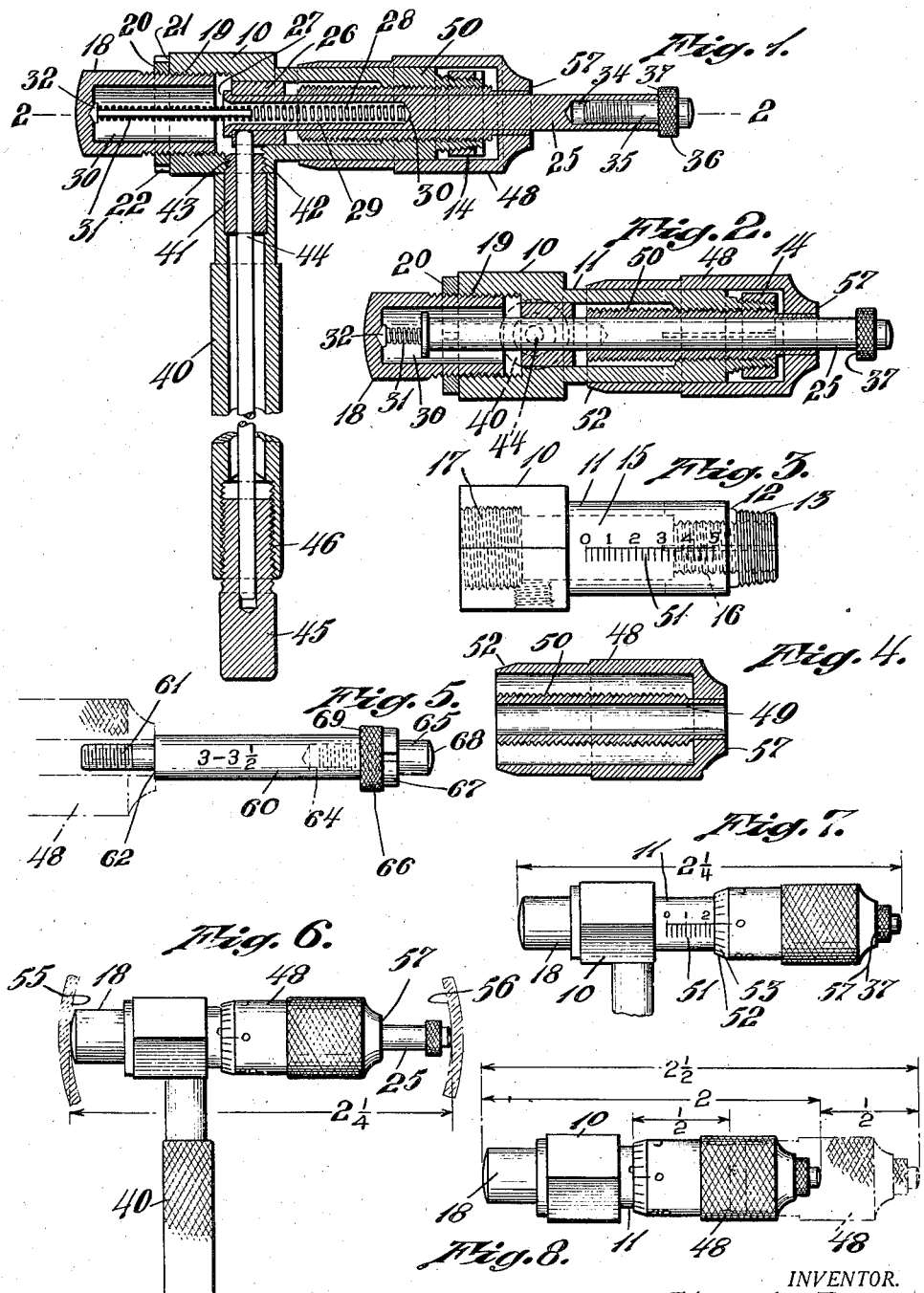
INVENTOR.
Hugh James
BY Barlow & Barlow
ATTORNEYS.

Patented Oct. 25, 1938

2,134,516

UNITED STATES PATENT OFFICE 2,134,516

GAUGE

Hugh James, Montrose, Ill., assignor to Brown & Sharpe Manufacturing Company, a corporation of Rhode Island Application January 11, 1935, Serial No. 1,395

7 Claims. (Cl. 33—164)

This invention relates to a machinist's tool, and has for one of its objects the provision of a tool which in one unit instrument has a telescopic gauge and a micrometer measure of the distances between the contact points of the gauge.

Another object of the invention is the provision of a compact telescoping gauge and micrometer instrument by reason of the concentric arrangement of the telescoping and micrometer parts.

Another object of the invention is the provision of an instrument by which a dimension may be transferred from one point to another without changing the setting of the instrument and at the same time permit measuring of other parts.

Another object of the invention is the provision of a device which may itself be set to a certain specified dimension, and then this setting transferred to another point without change; and all without the use of a separate measuring micrometer.

Another object of the invention is the provision of a telescoping gauge and micrometer by which the telescoping member can be clamped and the micrometer left free for movement, whereby the setting of the telescoping part may be changed to a smaller size by a definite known amount if desired, and there again clamped in position, thus allowing a measured comparative setting of the device.

Another object of the invention is the ability to obtain a reading as to size after the telescoping member has been permitted to expand to set the contacting surfaces the desired distance apart so that its size may be known without subjecting the telescoping parts to a separate measuring instrument.

Another object of the invention is to provide a device which may be accurately set to the desired size and then used as a gauge so that a distance may be checked by a test.

With these and other objects in view, the invention consists of certain novel features of construction, as will be more fully described, and particularly pointed out in the appended claims.

In the accompanying drawing:

Fig. 1 is a sectional view through the gauge with the telescoping members in expanded position;

Fig. 2 is a sectional view at right angles to Figure 1 and on substantially line 2—2 of Figure 1, and showing the telescopic members in partially contracted position;

Fig. 3 is a plan view of the body part of the device;

Fig. 4 is a sectional view through the thimble of the micrometer screw;

Fig. 5 illustrates in full lines an extension pin, and in dotted lines the portion with which it may be assembled;

Fig. 6 is a side elevation with the handle broken away, illustrating the act of measuring a diagrammatically indicated cylindrical bore;

Fig. 7 is a side elevation with the handle broken away and showing the thimble as moved to measuring position;

Fig. 8 illustrates in full lines the contracted position of the device, and in dotted lines an expanded position thereof showing the limits of movement or the range for measuring an internal diameter.

Telescoping gauges which exist in the art at the present time are used by being inserted into the opening which they are to measure, as is an inside caliper, then clamped and taken from this position and subjected to some micrometer measurement, thus requiring a separate instrument to be applied to the gauge, in order that the internal distance may be known, or possibly such gauge is used only for testing comparative sizes. There also exist certain micrometer inside calipers which are not provided with any telescoping expansible part nor any handle cooperating with the measuring part; and these are awkward in handling and must be rotated while in a position between the surfaces which they are to measure and are inconvenient for their operation and are of complicated construction; and in order that an extremely simplified construction may be provided possessing advantages superior to either of these instruments and yet allowing the telescoping gauge to be practically independent of the measuring portion of the unit and permitting rotation of the micrometer screw for measurement of telescopic expansion, I have provided an instrument capable of a wide range of use which is very compact in form by reason of the concentric relation of the parts which incorporates all of these advantageous features, and one in which the handle has an actuating device for the clamping of the telescoping members in desired position; and the following is a more detailed description of the present embodiment of this invention, illustrating the preferred means by which these advantageous results may be accomplished.

With reference to the drawing, I provide a body 10 which is of hexagonal shape with an integral cylindrical barrel 11 extending from one end thereof which at its distant end is split and is tapered as at 12 and threaded as at 13 along this taper, so as to be capable of receiving a nut 14 for suitable contraction thereof.

The body and barrel are provided with an intermediate bore 15 which is continued at the barrel end by a smaller threaded bore 16 with which the micrometer screw engages and which is continued in the other direction by a larger threaded bore 17 wholly within the body 10 for the reception of the fixed feeler member 18 provided with threads 19 for engagement with the thread 17. The member 18 is clamped in fixed position by a nut 20 engaging the thread 19 and binding against the end surface 21 of the body. This nut 20 is manipulated by a suitable spanner wrench engaging notches 22 in the nut 20. This feeler member 18 is hollow for the reception of a resilient spring and a movable feeler 25 to be more fully described.

A movable feeler member or distance pin 25 is slidably mounted in a bushing 26 which is fixed within the bore 15 of the body and barrel and the pin 25 may slide in the bushing so as to telescope into the hollowed out portion of the fixed feeler member 18. This distance pin is provided with a flange 27 to engage the bushing 26 to limit its outward movement in a direction away from the member 18. The pin or movable feeler member is solid throughout a substantial portion of its length and is provided with a recess or bore 28 for the reception of a helical spring 29 which abuts the end 30 of this bore and encircles the guide rod 31 which is anchored to the inner surface at 32 of the member 18, the spring also abutting at the anchored end of this pin so that its inherent expansion tends to project the distance pin or feeler member outwardly away from the member 18 and against a surface to be measured.

The outer end of the distance pin or movable feeler member is provided with a threaded bore 34 into which a contact tip 35 is threaded. This tip 35 is provided with a fixed knurled collar 36 providing a shoulder 37 for engagement with the end of the member 25. Size adjustment is provided in the member 18 and nut 20, there being therefore no need for adjustment at tip 35.

A tubular handle 40 is provided with a bushing 41 at one end which is threaded as at 42 to extend into the threaded opening 43 in the body 10. This bushing 41 slidably receives a binding spindle 44 which is projected through the bushing 26 by means of a rotary member 45 threadingly engaging as at 46 the outer end of the handle, thus when the member 45 is turned, the spindle 44 will be moved through the bore of bushing 41 and into engagement with the distance pin or movable member to bind it securely in the position of its adjustment when engaged to hold the distance pin against the action of the spirng 29.

The micrometer thimble 48 is provided with a fixed sleeve 49 on the outer surface 50 of which there is provided a micrometer screw which will engage the nut or threaded bore 16 so that as the thimble 48 is rotated, it will move axially along the barrel 11. The sleeve 49 slidingly fits about and is concentric with the feeler member 25 or distance pin so that the pin may freely slide through the sleeve 49 to its desired extended position. The barrel 11 is suitably graduated as at 51 longitudinally thereof, while the edge of the thimble is beveled as at 52 and provided with graduations 53 for cooperating with the gauge 51 so that a movement of the thimble along the barrel may be accurately determined.

Operation

In use, if the distance between the surfaces 55 and 56 are to be measured, as shown in Figure 6, the body portion of the instrument will be positioned so that it is between the surfaces and the binding spindle in the handle will be loosened to withdraw the spindle 44 so as to permit expansion of the distance pin 25 and a movement away from the feeler member 18 until abutment of the feeler members occurs, as in Figure 6. The binding spindle will be rotated to bind the distance pin or feeler member in this position, and the device will then be withdrawn from the bore which it is to measure so that it may be conveniently held in the hand for further manipulation. In order to learn the distance between the surfaces 55 and 56, now that the instrument has been withdrawn, the thimble 48 will be rotated in a direction to move its abutment end 57 outwardly until it contacts the shoulder 37, as shown in Figure 7, whereupon the reading between the scales 51 and 53 will be observed and it will be found, if the measurement is as shown in Figure 7, that two hundred fifty thousandths are indicated, or in other words, as a basic measurement of the device is two inches in its collapsed position, as in Figure 8, it will be known that the distance between the surfaces is two and one-quarter inches.

Another use of this device is to set it at an exact length and use it for testing; for instance, the binding spindle will be loosened, permitting full extension of the distance pin 25. The micrometer thimble will then be set to the desired dimension, such for example, as two and one-quarter inches, see Figure 7. The distance pin will then be moved in to cause its abutment shoulder 37 to engage the abutment surface 57 of the thimble, and then while these abutment surfaces are in engagement, the binding spindle will be moved to clamp the distance pin in this position, as shown in Figure 7, and thus an accurate two and one-quarter inches for the gauge or the like is acquired. After binding, the micrometer thimble may be rotated inwardly or not from this position, as desired.

The contracted position of the device here shown will be approximately two inches, thus the basic range will be from two inches to two and one-half inches, as shown between the full and dotted lines in Figure 8. If, however, it is desired to measure some distance which is greater than two and one-half inches, an extension rod will be used. The tip 35 will be removed from the pin 25 and the extension rod will be fitted into the end of the distance pin. One such extension rod is shown at 60 in Figure 5. The length of this rod is sufficient so that the device will measure from three to three and one-half inches. The threaded end 61 of the extension rod 60 is reduced and the diameter of the rod 60 will be greater than that of the distance pin 25 so that when fitted therein a shoulder 62 will be left at its junction with the distance pin, which shoulder will take the place of the shoulder 37, as shown in Figure 6. This extension rod projects the extent of the distance pin so that a greater distance may be measured than heretofore. Of course, it will be apparent that extension rods of various lengths may be applied to the distance pin or movable feeler finger member for the accomplishment of this result, and in these cases a micrometer screw or thimble will be similarly extended until its abutment end 57 engages the shoulder 62 and then a reading will be taken between the scale surfaces 51 and 53 as before, in order that the distance of extension of the projected distance pin or movable feeler member may be accurately measured.

The extension rod is provided with a bore 64 at its outer end into which a threaded tip 65 is inserted, this tip being provided with a knurled nut 66 threadingly engaging the tip for easy handling of the tip and a binding nut 67 to clamp the knurled handle 66 in position. This knurled nut serves as a shoulder 69 to determine the distance from the end 68 that this tip will project beyond the end of the extension and may be adjusted to determine the proper accurate measurement of the device.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In a gauge, a pair of telescoping feeler members having end engaging surfaces, a spring within said members for moving said members apart, micrometer means co-axial with and interposed between said end surfaces of said feeler members for measuring the distance between the engaging surfaces of said members, a handle secured to one of said feeler members and extending at right angles to the axis of said members, and a binding spindle in said handle and operable therethrough for movement into engagement with the other feeler member for holding the said other member in fixed position relative thereto.

2. In a gauge, two relatively telescoping measuring members having end engaging surfaces, a handle secured to one of said members and extending at right angles to the axis of said members, a binding spindle in said handle and operable therethrough for holding the other member in fixed position relative thereto, an abutment carried by one of said measuring members adjacent its tip, threaded means carried by the other member, and a micrometer screw interposed between said measuring members and engaging said threaded means and movable into engagement with said abutment to measure the distance of the engaging surfaces of said measuring members, said screw being co-axial with the end engaging surfaces of said measuring members.

3. In a gauge, two relatively telescoping feeler members, one of said members being slidable and provided with a threaded bore in its end for the reception of a removable measuring tip, an extension member in said bore itself provided with a measuring tip, said extension member being larger than said feeler member at its juncture with said feeler member providing a shoulder abutment, and a micrometer screw interposed between said feeler members and engaging a fixed portion of the other member and movable into engagement with said abutment for measurement of the distance between the engaging surfaces of said measuring members.

4. In a gauge, a body, a fixed feeler member extending from one end thereof, a handle secured to an intermediate portion of said body and extending generally at right angles to the body, a movable feeler member extending from the other end of said body and telescopically related to said body and feeler member and axially aligned with the latter, a shoulder on said movable feeler member, a spring acting between said members tending to move them apart to an expanded position, a clamp spindle in said handle for engaging said movable feeler member for holding it in different telescoping positions of adjustment, and a micrometer co-axial with the ends of said feeler members and comprising screw and nut parts one fixed with relation to said body and the other movable, while said feeler members are clamped, into engagement with said shoulder to measure the relative position of said feeler members and determine the distance apart of their engaging surfaces.

5. In a gauge, a body member having an outer cylindrical portion provided with graduations and a longitudinal bore of which one end is interiorly threaded, a feeler member fixedly secured in the other end of said bore and extending outwardly therefrom, a movable feeler member extensible from the threaded end of said bore and telescopically related to said body and fixed feeler member and axially aligned with the latter, an abutment fixed on said movable feeler member and movable therewith, a spring acting between said feeler members and tending to urge them apart in different relative expanded positions, and a micrometer thimble co-axial with said feeler members and separably movable about said cylindrical body portion, said thimble having an interior sleeve concentric with and movable relative to the movable feeler member independent thereof, and through which said movable feeler member may freely slide to any of its extended positions, said sleeve being exteriorly threaded for engaging the threaded portion of said bore so that upon rotation of the thimble into engagement with said abutment, the thimble will move axially along said cylindrical body portion and said movable feeler member to indicate the adjusted position of the extremities of the feeler members.

6. In a gauge, two relatively telescoping measuring members having measuring contact points at their opposed extremities, resilient means to move said members apart, clamping means to hold said members in different relative positions, one of said members having a shoulder adjacent its measuring contact end, and micrometer means co-axial with said measuring members and disposed intermediate of the measuring extremities of said members and separably movable along the other of said members and relative to and into engagement with said shoulder for measuring the relative position of said members.

7. In a gauge, two relatively telescoping measuring members having measuring contact points at their opposed extremities, resilient means to move said members apart, clamping means to hold said members in different relative positions, one of said members having a shoulder adjacent its measuring contact end, and micrometer means in threaded engagement with the other measuring member and co-axial therewith and disposed intermediate of the measuring extremities of said members and separably movable therealong into engagement with said shoulder for measuring the relative position of said members.

HUGH JAMES.